June 8, 1948. E. CRABTREE 2,442,798
SPOT WELDER TIP
Filed Aug. 2, 1946

Inventor
Ernest Crabtree
by Frederick C. Bromley
ATTY.

Patented June 8, 1948

2,442,798

UNITED STATES PATENT OFFICE 2,442,798

SPOT WELDER TIP

Ernest Crabtree, Toronto, Ontario, Canada

Application August 2, 1946, Serial No. 688,000

1 Claim. (Cl. 219—4)

My invention relates to improvements in spot welder tips of the ejector type, and has for its object to provide a means by which a tip can be quickly and easily released from the holder in which it is seated irrespective of how fast it may stick therein.

Tips of this kind are conventionally provided with a tapered end by which they are fitted in the holder seat. In usage the repeated impacts of the tips or electrodes against the work tends to jam or bind them in their seats so tightly that they are exceedingly difficult to remove for replacement or reconditioning as required from time to time in the use of a spot welder.

In prior art structures ejectors have been proposed for forcibly expelling the tips, but these call for a specially constructed holder inasmuch as the ejecting mechanism is disposed within the same. For reasons obvious to those skilled in the art such devices have attendant disadvantages in addition to their cost.

My invention provides an exceedingly simple and effective expedient for withdrawing a tip from a holder, comprising the provision of a threaded section on the tip intermediate of its head and tapered end, on which is engaged a nut or equivalent element which on being turned in the proper direction screws up against the adjacent end face of the holder to forcibly pull it from seating contact. In practice, it has been found that this device is exceedingly effective and serviceable. Moreover, it is cheap to manufacture and can be used in association with a standard holder.

The invention is illustrated in the accompanying drawing in which.

Figure 1:
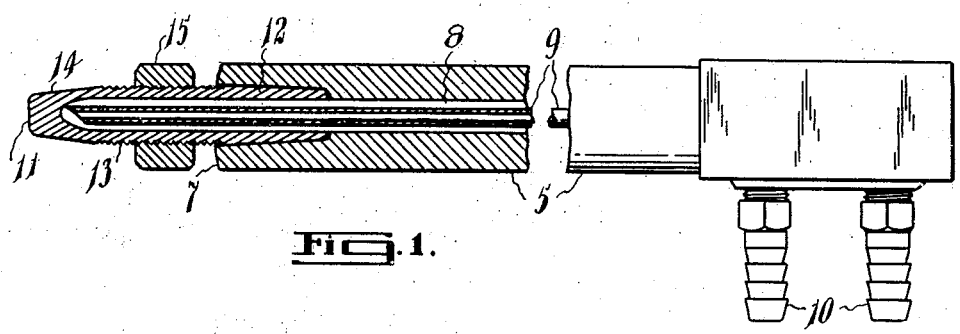
Fig. 1 is an elevation view partly in section showing a tip or electrode seated in a holder and constructed in accordance with the invention of the ejector means forming the subject matter of improvement.
Figure 2:
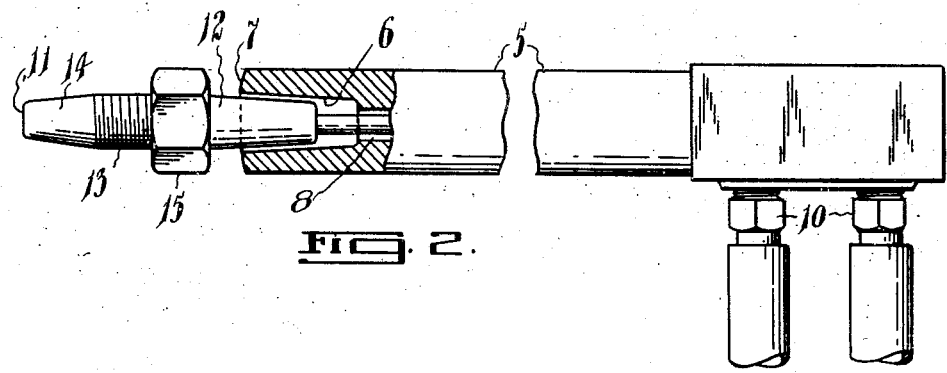
Fig. 2 is a similar view but depicting the tip or electrode unseated from the holder.
Figure 3:
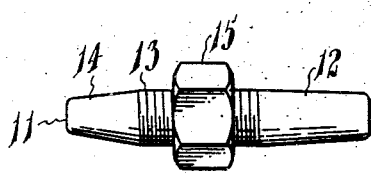
Fig. 3 is a side elevation of the tip or electrode showing the ejector nut thereon.
Figure 4:
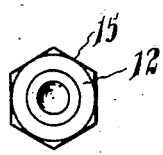
Fig. 4 is an end view of Fig. 3.

Referring to the drawing by like numerals of reference, there is denoted at 5 an ordinary holder for a replaceable tip of a spot welder. The tapered seat of the holder is indicated at 6 and extends inwardly from the end face 7 and communicates with the axial bore 8 which forms a part of the water cooling system including the circulating tubing 9 and the water line connections 10, all as well understood in the art.

The tip is denoted at 11 and is drilled for the reception of the circulating tubing 9, as customary. The seating end of said tip 11 is tapered as usual and preferably has either a No. 1 or No. 2 Morse taper, or other suitable release taper. This tapered end is denoted by the reference character 12 and it is seated in contiguous contact with the seat 6 aforesaid whereby the tip is securely mounted with remaining portion projecting forwardly from the end of the holder.

In carrying out my invention I provide the girth of the tip 11 with threads 13 for a portion of its length intermediate of the tapered end 12 and the head end 14. A thread of a suitable pitch may be used. The threaded section extends immediately forward from the taper end 12. A nut 15, or like element, is engaged with the threads 13. Said nut is adapted to be screwed against the end face 7 of the holder in order to forcibly pull the tip to unseat it from the seating socket 6. The end face 7 is utilized as a shoulder for taking the thrust in the unseating operation. The nut is not tightened against the end face except for the purpose of removing the tip and normally it may remain free on the tip ready for an ejecting operation.

It will be manifest that the invention by reason of its simplicity of construction and operation, provides a highly satisfactory ejector device which does not injure or mar the tip.

What I claim is:

A tip for a holder of a spot welder having a socket tapered inwardly of an end portion, said tip being formed of a cylindrical member substantially of a uniform diameter throughout its length and tapered at an end to fit into said socket, the tip-forming member being externally threaded adjacent to the tapered end thereof, and a nut screwed on the threaded part of said member for tightening against said end portion of the holder in order to exert a releasing pull on the tip.

ERNEST CRABTREE.

REFERENCES CITED

The following references are of record in the file of this patent:

UNITED STATES PATENTS

| Number | Name | Date |
| --- | --- | --- |
| 2,368,550 | Kruitbosch | Jan. 30, 1945 |
| 2,374,348 | Harding | Apr. 24, 1945 |
| 2,390,936 | Hall | Dec. 11, 1945 |